April 3, 1951  A. M. OLSON  2,547,768
VEHICLE BUMPER JACK

Filed March 11, 1947  3 Sheets-Sheet 1

Inventor

Alton M. Olson

By *Clarence A. O'Brien
and Harvey B. Jacobson*
Attorneys

April 3, 1951  A. M. OLSON  2,547,768
VEHICLE BUMPER JACK
Filed March 11, 1947  3 Sheets-Sheet 2
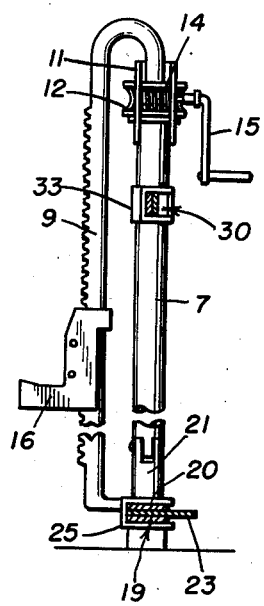
Fig. 3.
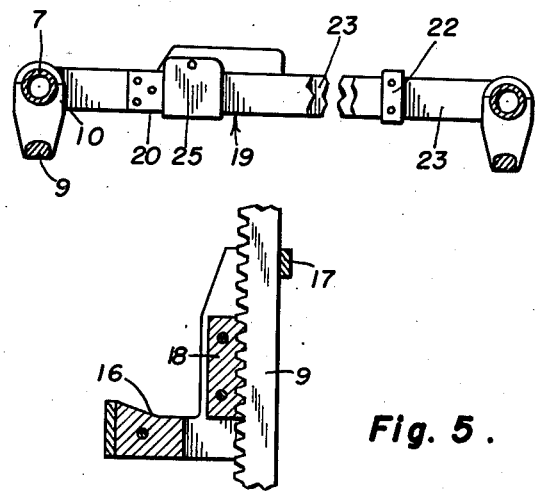
Fig. 4.
Fig. 5.
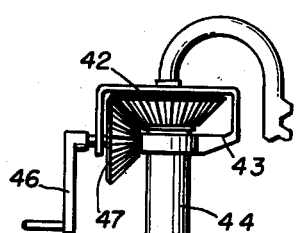
Fig. 6.
Fig. 8.
Fig. 7.
Inventor
Alton M. Olson
By *Clarence A. O'Brien and Harvey B. Jacobson*
Attorneys April 3, 1951  A. M. OLSON  2,547,768
VEHICLE BUMPER JACK
Filed March 11, 1947  3 Sheets-Sheet 3
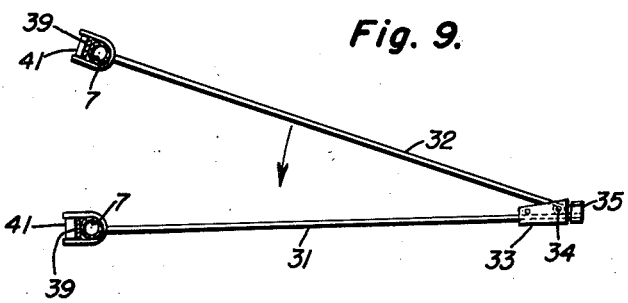
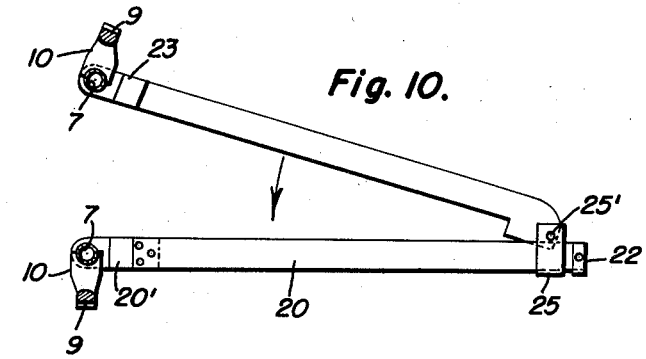
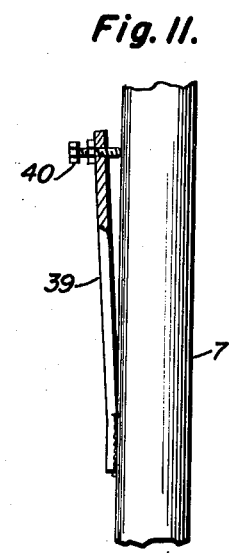
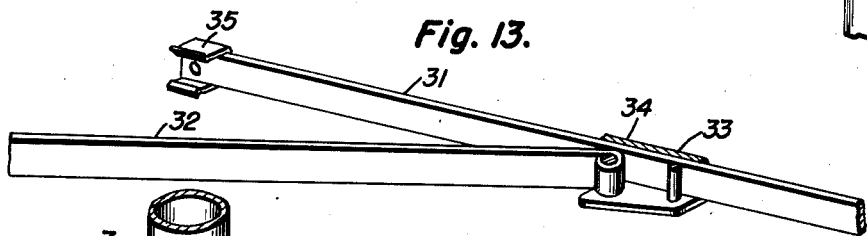
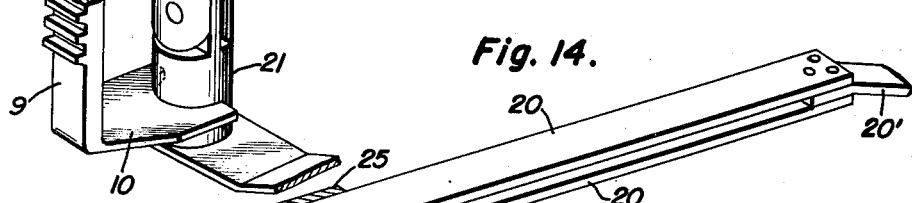
Alton M. Olson
INVENTOR.

Patented Apr. 3, 1951

2,547,768

UNITED STATES PATENT OFFICE 2,547,768

VEHICLE BUMPER JACK

Alton M. Olson, Northwood, N. Dak.

Application March 11, 1947, Serial No. 733,794

6 Claims. (Cl. 254—100)

The present invention relates to new and useful improvements in vehicle jacks and more particularly to a bumper jack adapted to engage a vehicle bumper adjacent each end to lift the entire end of the vehicle.

An important object of the invention is to provide a vehicle jack embodying a pair of jack members adapted for positioning at the ends of a bumper and connecting the jacks to each other to prevent tilting thereof.

A further object is to provide adjustable braces between the jacks adapted for folding into a compact form for conveniently storing and shipping purposes.

Another object is to provide a jack of this character which is strong and durable, efficient and reliable in use, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a vertical sectional view taken on the line 3—3 of Figure 1;

Figure 4 is a horizontal sectional view taken on the line 4—4 of Figure 1;

Figure 5 is an enlarged fragmentary sectional view of one of the bumper lifting arms taken on the line 5—5 of Figure 2;

Figure 6 is an enlarged fragmentary sectional view of one of the jack screws and worm gears therefor;

Figure 7 is a plan view of the jack in folded position;

Figure 8 is a detail of a modified gear construction for the jack screw;

Figure 9 shows the top brace partially folded, the figure being a horizontal sectional view of the structure at the line 9—9 in Figure 1, although the brace is shown partially folded and the lower brace structure is deleted to improve the clarity of representation;

Figure 10 is a similar view of the lower brace partially folded, with contiguous structure;

Figure 11 is an enlarged view of the spring plate and set screw on the upper portions of the posts;

Figure 12 is a view, in perspective, of the structure at the lower end portion of the post; and Figures 13 and 14 are enlarged fragmentary views, in perspective, of portions of the upper and lower braces in partially folded positions.

Figure 1:
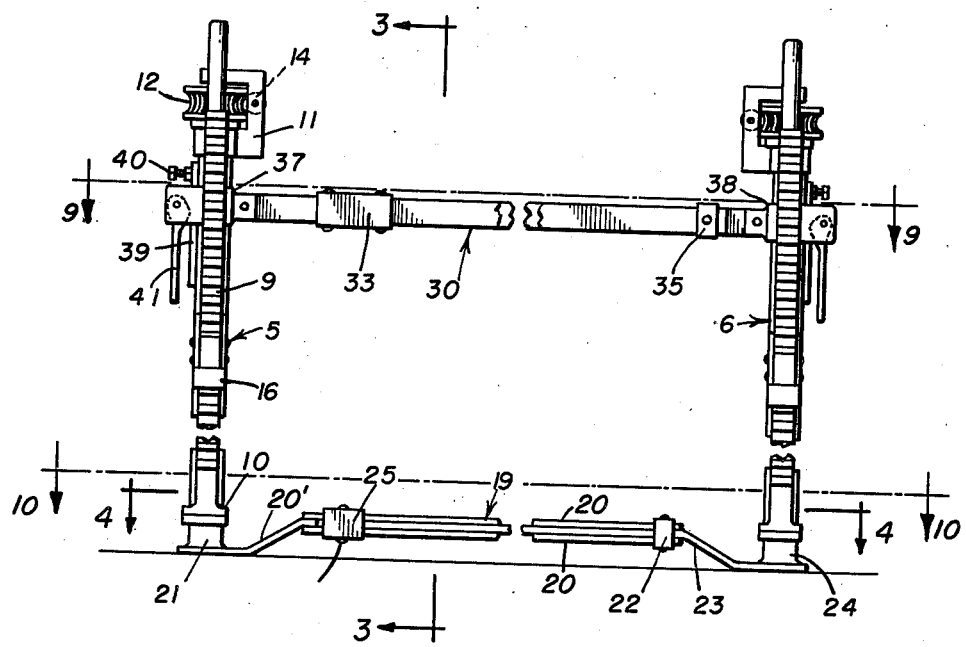
Figure 1 is a view in elevation of the jack.
Figure 2:
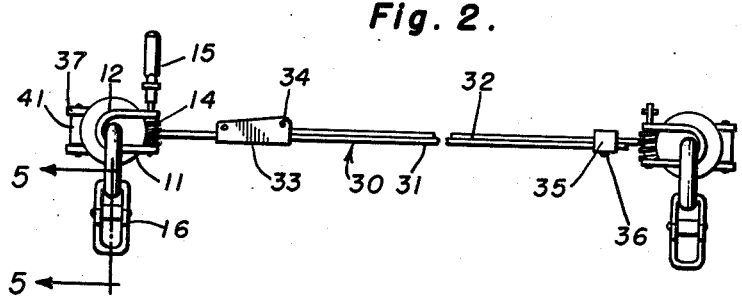
Figure 2 is a top plan view.

Referring now to the drawings in detail wherein for the purpose of illustration, I have disclosed a preferred embodiment of my invention, the numerals 5 and 6 designate a pair of jack units of duplicate construction and accordingly a detailed explanation of one will suffice for both.

Each jack unit comprising a tubular post 7 in which a jack screw 8 is positioned for vertical adjustment, the screw being formed as one leg of an inverted U-shaped member having a rack 9 on its other leg. The lower end of rack 9 is formed with a horizontal inwardly projecting yoke 10 slidable vertically on the post 7.

A U-shaped bracket 11 is suitably secured in a horizontal position to the supper portion of the post 7 with the upper end of the bracket overlying a worm gear 12 threadedly carried at the upper end of the screw 8 and held against a flange 13 at the upper end of post 7. A worm 14 is journaled in the bracket 11 and provided with a crank handle 15 to operate the gear to move the screw vertically in the post.

A lift arm 16 of substantially L-shaped construction has a collar 17 at its upper end embracing the rack 9 and below the collar is a toothed plate 18 engaging the teeth of the rack. The side of the collar adjacent the plate 18 is open to provide for a swinging movement of the lower end of the arm away from the side of the rack to free the teeth of the plate from the teeth of the rack and permit a quick sliding adjustment of the arm on the rack. The lower end of arm 16 is curved upwardly at its outer end to provide a seat for a vehicle bumper.

A lower folding horizontal brace 19 connects the lower ends of the post 7 of the jack units 5 and 6, the brace including a pair of vertically spaced cross bars 20 to one end of which is secured an offset element 20' to the outer end of which a lower post extension 21 is welded or otherwise suitably secured and the post 7 of jack unit 5 is pivotally connected to the extension 21 for vertical raising and lowering swinging movement.

The other ends of the bars 20 are connected by a horizontal U-shaped clip 22.

The brace 19 further includes a single cross bar 23 having one end also provided with an upstanding lower post extension 24 pivoted to the post of jack unit 6 by a simple hinge joint as illustrated in Figure 3. The other end of bar 23 is pivoted between a U-shaped slide 25 slidable on the bars 20, the bars 20 and 23 being adjustable longitudinally of each other and swingable horizontally into and out of folded position to move the jack units toward or away from each other.

An upper folding horizontal brace 30 connects the upper portion of the posts 7 and includes a pair of cross bars 31 and 32 having their inner ends positioned side by side in overlapping relation to each other. The bar 31 is provided with a horizontal U-shaped slide 33 freely mounted thereon and to which the inner end of bar 32 is pivotally connected on a pin 34. A horizontal U-shaped member 35 is secured to the inner end of bar 31 by a pin 36 and receives the bar 32 in its open side.

The outer ends of bars 31 and 32 are formed with yokes 37 and 38, respectively, slidably positioned on the posts 7. A spring plate 39 is positioned in the outer ends of each yoke for bearing against one side of its adjacent post, one end of the plate being welded to the post and the other end having a set screw 40 holding said free end of the plate spaced from the post. A cam 41 is pivoted in the outer end of the yoke for clamping against the plate 39 to secure the brace 30 in a vertically adjusted position on the post.

In Figure 8 I have shown a modified gear operating construction for the jack screw and which includes a bevel gear 42 journaled in a U-shape bracket 43 at the upper end of post 44 and through which the jack screw 45 travels. The crank handle 46 is provided with a bevel gear 47 meshing with gear 42.

In the operation of the device, by swinging the jack units 5 and 6 away from each other into an open position as shown in Figure 1, the lift arms 16 may be engaged under a vehicle bumper adjacent the ends thereof to lift the entire end of the vehicle by operating the handles 15 to raise the screws 8 and racks 9.

The jack is folded into the position shown in Figure 7 by moving the yokes 10 at the lower ends of racks 9 outwardly to disengage the same from the posts below the pivot of the posts 7 to permit folding the posts downwardly and the upper brace 30 is released by clamps 41 and moved downwardly on the posts and both the upper and lower braces folded to swing the jack units 5 and 6 toward each other. In recapitulation, after the upper brace has been slid downwardly adjacent to the lower brace, both braces are folded, as indicated in Figures 9, 10, 13 and 14, and then posts 7 are folded, carrying the racks 9 with them, into the final positions indicated in Figure 7.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A vehicle jack comprising a pair of jack units each including a hollow post, an inverted U-shaped member comprising one leg vertically adjustably mounted in said post and another leg comprising a rack, a lift arm adapted for positioning under a part of a vehicle adjacent each side thereof and adjustably mounted on said rack, and upper and lower separate foldable braces connecting the units.

2. A vehicle jack comprising a pair of jack units each including a tubular post, a vertically adjustable screw working in the post, a rack connected to the screw outwardly of the post, a lift arm adjustable on each rack adapted for positioning under a part of a vehicle adjacent each side thereof, braces connecting the units to each other to support the units in an upright position and including an upper brace, and clamps secured on each end of the upper brace in vertically adjustable clamping engagement with the posts.

3. A vehicle jack comprising a pair of jack units each including a hollow post, an inverted U-shaped member comprising one leg vertically adjustably mounted in said post and another leg comprising a rack, a lift arm adapted for positioning under a part of a vehicle adjacent each side thereof and adjustably mounted on said rack, and foldable braces connecting the units together, said lift arm being generally L-shaped and having a collar attached to the arm vertically slidable on and embracing said rack, a toothed portion beneath the collar and selectively engageable with the teeth on said rack and a load engaging horizontally disposed arm beneath said toothed portion.

4. A vehicle jack comprising a pair of jack units, each including a foldable tubular post, an inverted U-shaped jack member including a screw at one end working in the upper end of the post and a rack at the other end of said member positioned vertically outwardly of the post, operating means mounted on the post for the screw, a load engaging lift arm adjustably mounted on each rack, and a pair of foldable extensible braces separately connecting the upper and lower ends of the posts to each other.

5. A vehicle jack comprising a pair of jack units, each including a tubular post in two sections foldable about a common pivotal connection, an inverted U-shaped jack member including a screw at one end working in the upper end of the post and a rack at the other end portion of said member positioned vertically outwardly of the post, operating means mounted on the post for the screw, a foldable extensible upper brace mounted on the posts for vertical adjusting movement and connecting the posts to each other, and a foldable extensible brace connecting the lower ends of the posts, said rack having a stabilizing yoke on its lower end and straddling a lower end portion of the post, said U-shaped jack member being shiftable relative to said post sufficiently to allow folding of the post.

6. A vehicle jack comprising a pair of jack units, each including a foldable tubular post, an inverted U-shaped jack member including one leg comprising a screw working in the upper end of the post and the other leg comprising a rack positioned vertically outwardly of the post, a load engaging lift arm adjustably mounted on the rack, operating means mounted on the post for the screw, a jointed and foldable extensible upper brace mounted on the posts for vertical adjusting movement and connecting the posts to each other, and a jointed and foldable extensible brace connecting the lower ends of the posts, said posts having hinge joints near the lower ends thereof and being foldable about colinear axes normal to axes about which said second mentioned brace is foldable so that the posts may be first folded and the braces thereafter folded in substantial parallelism with the major portions of the posts, said colinear axes being horizontal and said second mentioned axes being vertical when the jack is in use.

ALTON M. OLSON.

REFERENCES CITED

The following references are of record in the file of this patent:

UNITED STATES PATENTS

| Number | Name | Date |
|---|---|---|
| 1,211,373 | Weaver | Jan. 2, 1917 |
| 1,243,360 | Stoudt | Oct. 16, 1917 |
| 1,497,046 | Trusler | June 10, 1924 |
| 1,561,753 | Swanner | Nov. 17, 1925 |
| 1,791,975 | Rodman et al. | Feb. 10, 1931 |
| 1,793,462 | Bolens | Feb. 24, 1931 |